United States Patent
Hu

(10) Patent No.: US 12,307,261 B2
(45) Date of Patent: May 20, 2025

(54) AUTOMATIC INSTALLATION METHOD AND SYSTEM

(71) Applicant: American Megatrends International, LLC, Norcross, GA (US)

(72) Inventor: Chih-Kai Hu, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 181 days.

(21) Appl. No.: 17/131,013

(22) Filed: Dec. 22, 2020

(65) Prior Publication Data

US 2022/0197667 A1 Jun. 23, 2022

(51) Int. Cl.
G06F 8/654 (2018.01)
G06F 8/61 (2018.01)
G06F 9/4401 (2018.01)
G06F 11/30 (2006.01)

(52) U.S. Cl.
CPC .............. *G06F 9/4416* (2013.01); *G06F 8/61* (2013.01); *G06F 8/654* (2018.02); *G06F 11/3058* (2013.01)

(58) Field of Classification Search
CPC .......... G06F 9/4416; G06F 8/61; G06F 8/654; G06F 11/3058
See application file for complete search history.

(56) References Cited

U.S. PATENT DOCUMENTS

| | | | |
|---|---|---|---|
| 10,019,252 B1* | 7/2018 | Cui | G06F 11/3006 |
| 10,572,242 B1* | 2/2020 | Santharam | G06F 8/71 |
| 2018/0136946 A1* | 5/2018 | El-Haj-Mahmoud | H04L 69/328 |
| 2018/0173516 A1* | 6/2018 | Tung | G06F 8/654 |
| 2019/0081929 A1* | 3/2019 | Cudak | H04L 41/0806 |
| 2019/0205109 A1* | 7/2019 | Smitthimedhin | G06F 11/3006 |
| 2020/0412708 A1* | 12/2020 | Oberoi | H04L 63/029 |
| 2023/0031302 A1* | 2/2023 | Hong | G06F 8/654 |

* cited by examiner

*Primary Examiner* — Jae U Jeon
(74) *Attorney, Agent, or Firm* — Birch, Stewart, Kolasch & Birch, LLP

(57) ABSTRACT

An automatic installation method is disclosed. The system suitable for a baseboard management controller (BMC) comprises: transmitting a enable remote media and setting an automatic configuration file to a BMC; mounting a share folder from a first server to the BMC; uploading an ISO file from the BMC to the first server, and mounting the ISO file into the share folder; copying the auto installation configuration file to the share folder, and repacking the auto installation configuration file into the ISO file to generate a repacked ISO file; and transmitting the repacked ISO file to the first server.

6 Claims, 5 Drawing Sheets

AUTOMATIC INSTALLATION METHOD AND SYSTEM

BACKGROUND

Technical Field

The present invention relates to an automatic installation method and system, and in particular, the present invention relates to automatic installation method and system applying in a baseboard management controller (BMC).

Related Art

Server systems are available in a vast array of hardware configurations to meet varying needs of data centers. Operating systems (OS) are essential system software for servers and other computing devices. The OS manages hardware and software resources and provide common services for applications. The installation of an OS to a server often requires significant time and resources. Additionally, the tradition installation technology always uses the kickstart configuration file to manufacture the automatic installation ISO image and need to make different iso files according to different environments.

SUMMARY

One object of the present invention is to provide an automatic installation method and system, which can perform the automatic installation process in the BMC, and applied in different system environment.

One object of the present invention is to provide an automatic installation method and system, which supports the cross-platform remote installation and does not need to manually install specific software on the server and does not have the KVM or BMC support related hardware.

In one embodiment, the automatic installation system suitable for a baseboard management controller (BMC) is provided. The automatic installation system comprises: an input interface, transmitting an enable remote media and setting an auto installation configuration file; a BMC, receiving the enable remote media and the automatic installation configuration file; and a first server, mounting a share folder to the BMC; wherein the BMC upload an ISO file to the first server when the first server mounts the share folder to the BMC, and the BMC copies the auto installation configuration file to the share folder, and repacked the auto installation file into the ISO file to generate a repacked ISO file, and the repacked ISO file is transmitted to the first server.

In the embodiment, the automatic installation system further comprises: a second server, receiving a boot host command from the enable remote media.

In the embodiment, the input interface is website user interface (UI) or an intelligent platform management interface (IPMI).

In the embodiment, the first server is a network file system (NFS) server.

DETAILED DESCRIPTION

Figure 1:
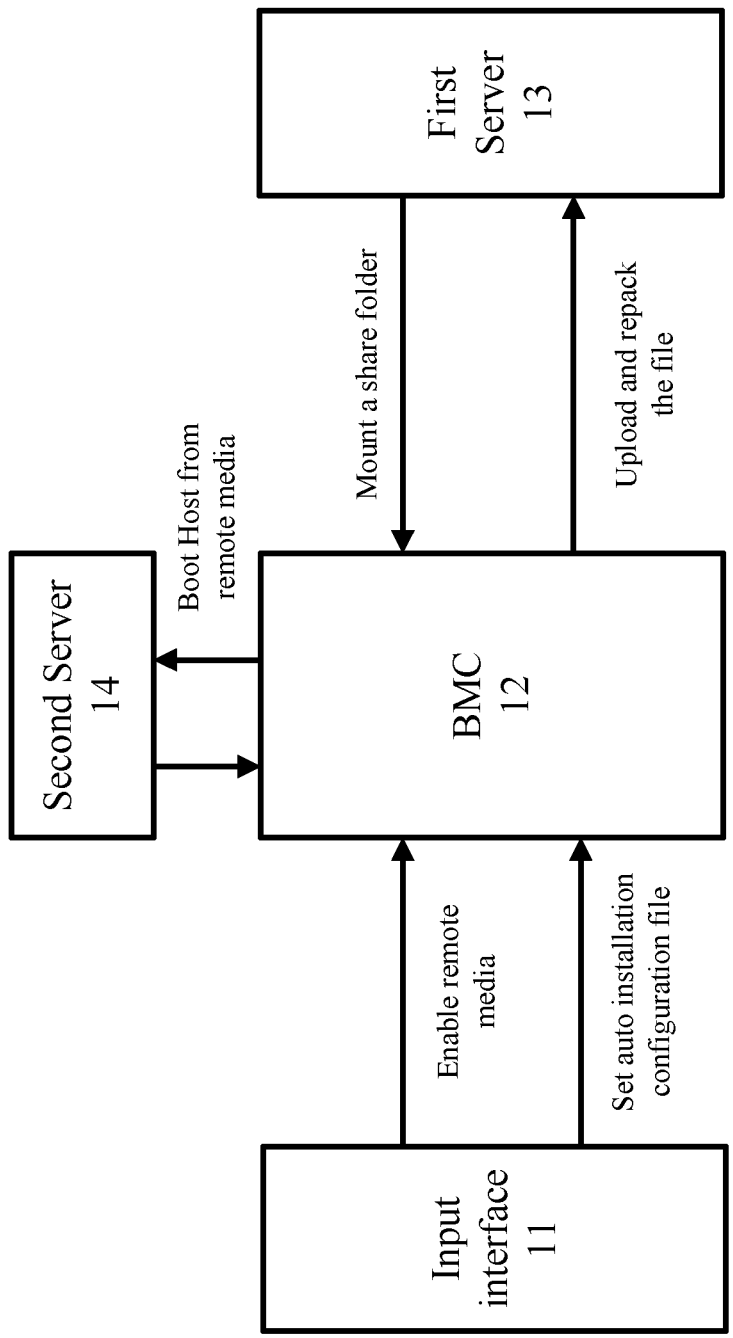
FIG. 1 shows a block diagram of an automatic installation system according to one embodiment of the present invention.

FIG. 1 shows a block diagram of an automatic installation system according to one embodiment of the present invention. As shown in FIG. 1, the automatic system is suitable for a baseboard management controller (BMC). The automatic system comprises: an input interface 11, a BMC 12, a first server 13 and a second server 14. The input interface 11 transmits enable remote media and set an automatic configuration file, wherein the input interface 11 is web site user interface (UI) or an intelligent platform management interface (IPMI). The IPMI is a set of computer interface specifications for an autonomous computer subsystem that provides management and monitoring capabilities independently of the host system's CPU, firmware (BIOS or UEFI) and operating system. Using IPMI, an administrator can mount an ISO image, simulate an installer DVD, and perform the installation remotely. The BMC 12 receives the enable remote media and the automatic installation configuration file, and the first server 13 mounts a share folder to the BMC 12, wherein the first server 13 is a network file system (NFS) server. Specifically, the BMC uploads an ISO file to the first server 13 when the first server 13 mounts the share folder to the BMC 12, and the BMC 12 copies the auto installation configuration file to the share folder, and repacked the auto installation file into the ISO file to generate a repacked ISO file, and the repacked ISO file is transmitted to the first server 13. The automatic installation system further comprises a second server 14. The second server 14 receives a boot host command from the enable remote media.

Figure 2:
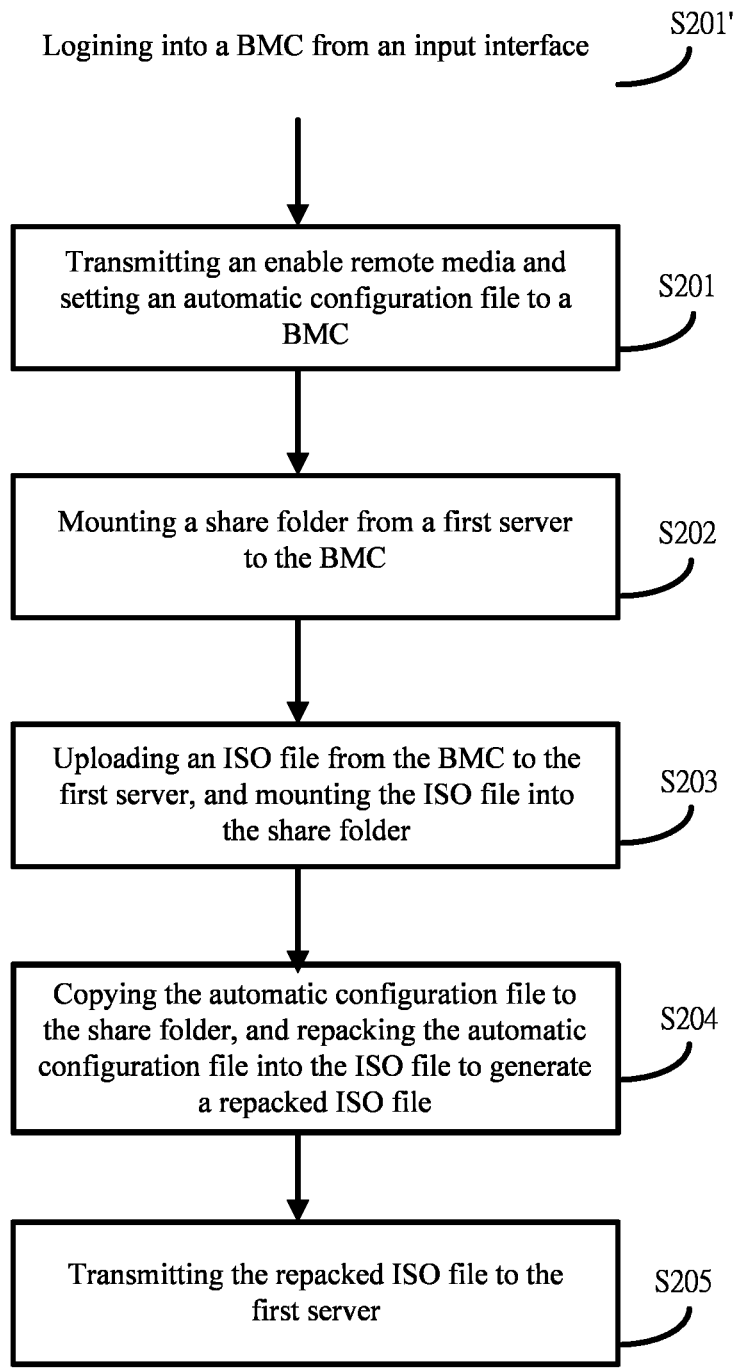
FIG. 2 shows a flow chart of the automatic installation method according to one embodiment of the present invention.

FIG. 2 shows a flow chart of the automatic installation method according to one embodiment of the present invention. As shown in FIG. 1 and FIG. 2, the method comprises: transmitting an enable remote media and setting an automatic configuration file to a BMC 12 (S201); mounting a share folder from a first server 13 to the BMC 12 (S202); uploading an ISO file from the BMC 12 to the first server 13, and mounting the ISO file into the share folder (S203); copying the auto installation configuration file to the share folder, and repacking the auto installation configuration file into the ISO file to generate a repacked ISO file (S204); and transmitting the repacked ISO file to the first server 13 (S205). The method may further comprises: transmitting a boot host command from the enable remote media to a second server 14. In one aspect, the method further comprises: logining into the BMC 12 from an input interface 11 (S201'), wherein the input interface 11 is a website user interface (UI) or an intelligent platform management interface (IPMI). Specifically, the input interface 11 is a website user interface (UI) or an intelligent platform management interface (IPMI) and the first server 13 is a network file system (NFS) server.

Figure 3:
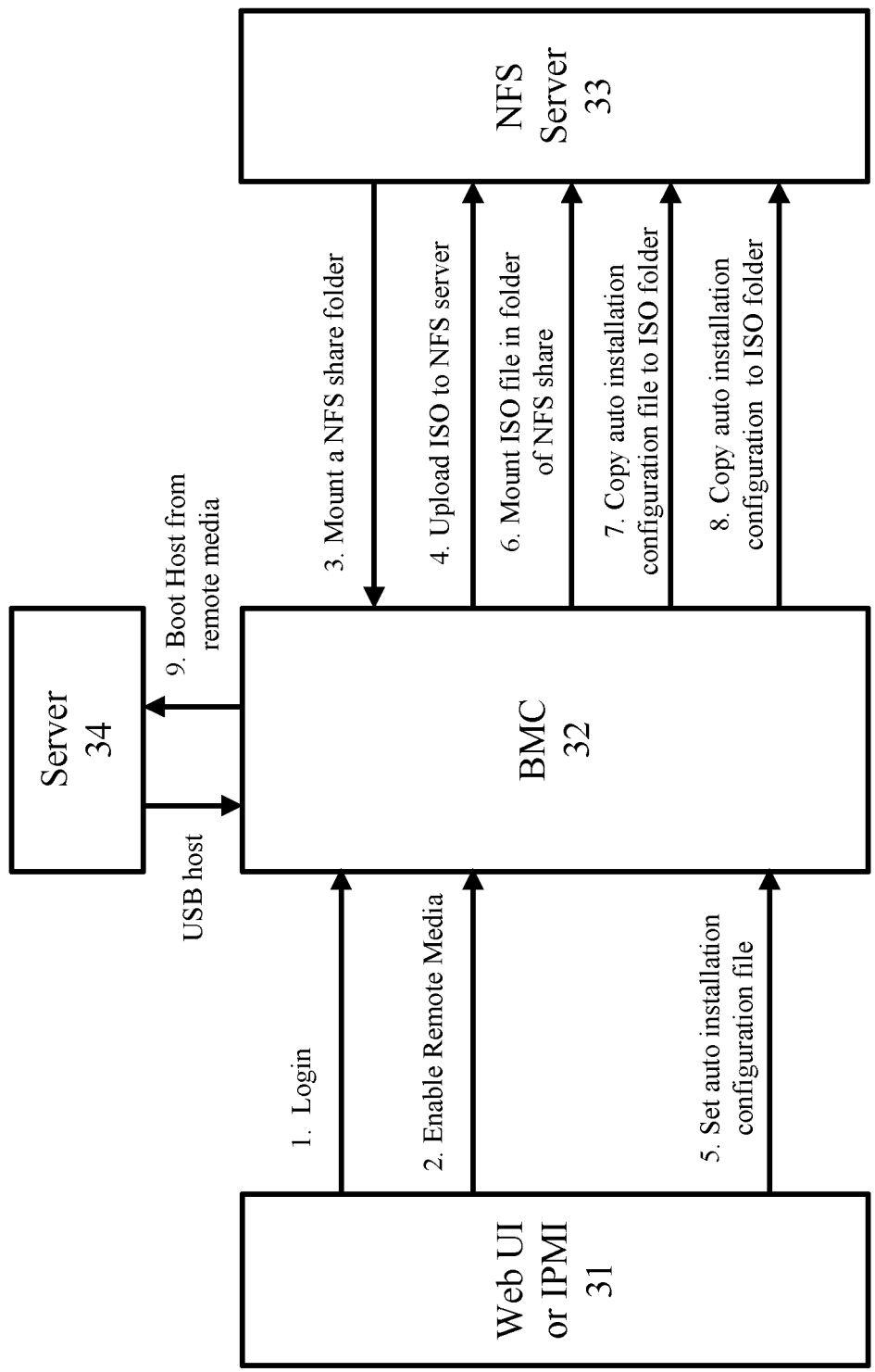
FIG. 3 shows an applied example of the automatic installation system.

FIG. 3 shows an applied example of the automatic installation system. As shown in FIG. 3, a Web UI or IPMI 33 (the input interface) login into the BMC 32, and enable the remote media to the BMC 32. Meanwhile, the NFS server 33 (the first server) mounts a NFS share folder to the BMC 32, the BMC 32 upload an ISO file to the NFS server 33. Further, the Web UI or IPMI 31 sets an automatic installation configuration file to the BMC 32, and the BMC 32 mounts the ISO file into the NFS share folder and copies the automatic installation configuration file to the share folder storing the ISO file. The BMC 32 transmits the boot host form the remote media to the server 34 (the second server).

Figure 4:
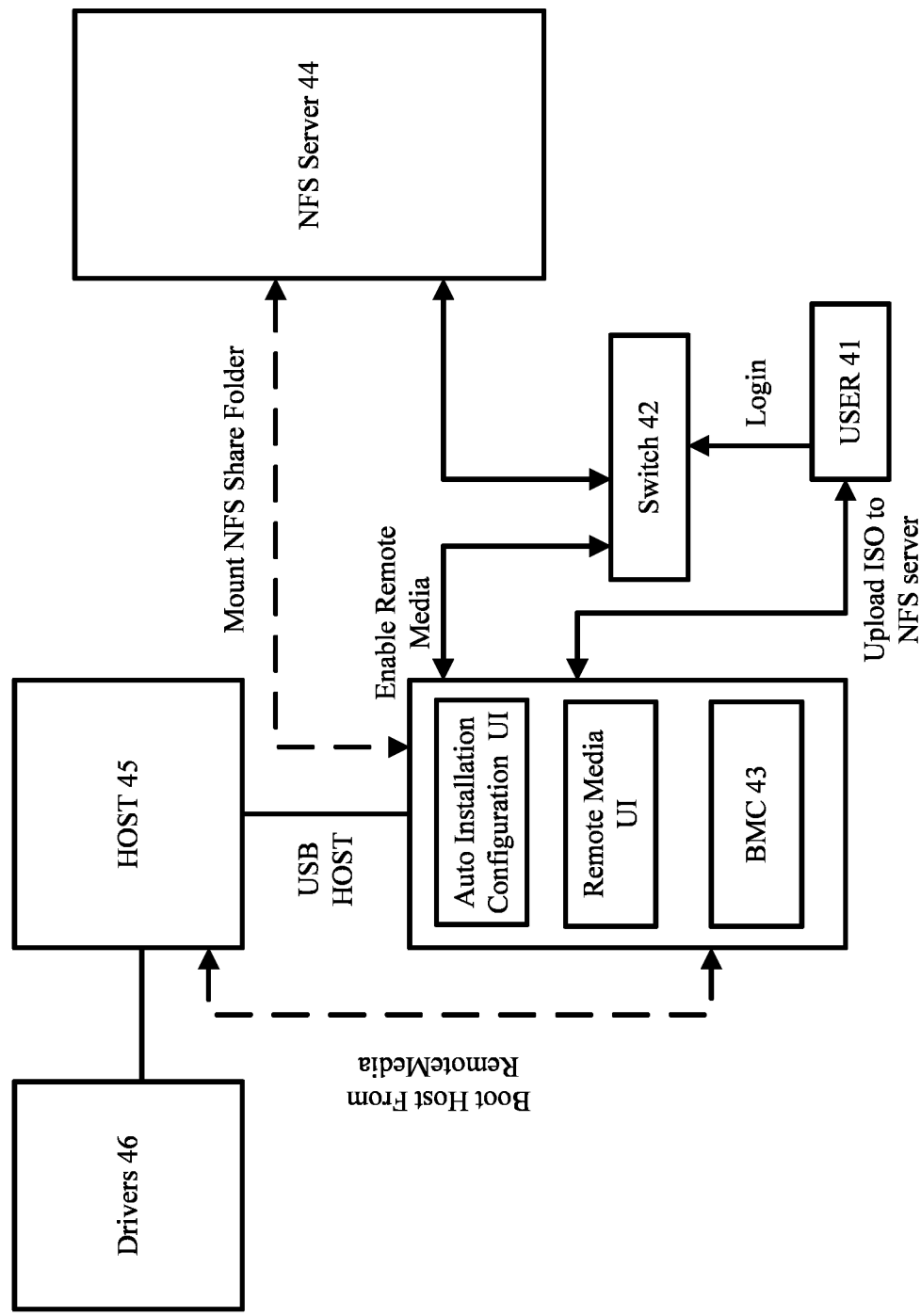
FIG. 4 shows another applied example of the automatic installation system.

FIG. 4 shows another applied example of the automatic installation system. As shown in FIG. 4, a User 41 logins into a switch 42 via the computer or other electronic devices, the switch 42 may be a managing LAN switch or router. The user 41 enables the remote media to the BMC 43 through the switch 42. Meanwhile, the NFS server 44 mounts a NFS share folder to the BMC 43. The BMC 43 uploads an ISO file to the NFS server 44, mounts the ISO file into the NFS share folder and copies the automatic installation configuration file to the share folder storing the ISO file. The BMC 43 transmits the boot host form the remote media to the host 45, and the host 45 controls the drivers 46.

Figure 5:
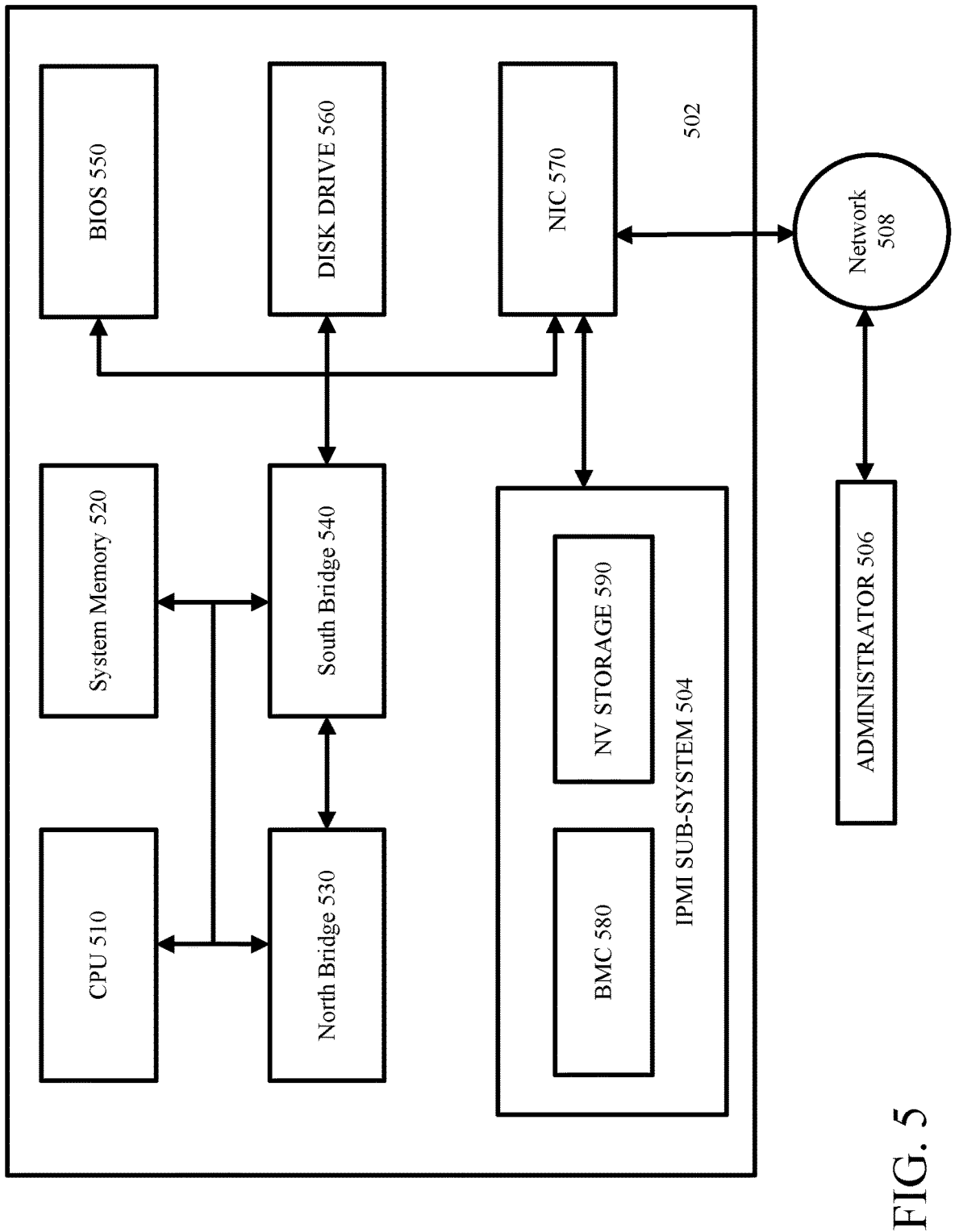
FIG. 5 shows a block diagram of an example server system 502 for automatic installation system.

FIG. 5 shows a block diagram of an example server system 502 for automatic installation system. The system software can be, for example, an OS or firmware. The server system 502 can include a central processing unit (CPU) 510, system memory 520, a north bridge 530, a south bridge 540, a BIOS 550, a disk drive 560, a network interface controller (NIC) 570, and an IPMI sub-system 504. In some instances, the northbridge 530 and the southbridge 540 can be combined into a single die, such as for example into a platform controller hub (PCH).

The IPMI sub-system 504 can include a baseboard management controller (BMC) 580, a non-volatile storage 590, and other management controllers (not shown) distributed among different system modules that are referred to as satellite controllers. The IPMI sub-system 504 can operate independent of the rest of the server system 502 and can function even when the server system 502 is powered down or shut off. The IPMI sub-system 504 can provide a way to manage the server system 502 that is powered down or is otherwise unresponsive. For example, the IPMI sub-system 504 and the NIC 590 can operate on standby power or in a low-power mode while the server system 502 is shut down.

The satellite controllers within the same chassis connect to the BMC via Intelligent Platform Management Bus (IPMB), an implementation of Inter-Integrated Circuit (IIC or I2C) protocol. The IIC protocol features a multi-master, multi-slave, single-ended, serial computer bus that uses a Serial Data Line and a Serial Clock Line with a 7-bit or a 10-bit address space.

The BMC 580 can include a microcontroller that manages interfaces between system management software and platform hardware. In some implementations, each BMC 580 can manage hardware components within the server 502, such as processors, memory, storage devices, PSUs, fans, boards, etc.

In some implementations, the BMC 580 can communicate with the various server components that the BMC 580 manages using the IPMI protocol. IPMI is a set of specifications for an autonomous computer subsystem that manages and monitors a computer system's CPU, firmware, and OS, and for out-of-band management and monitoring by system administrators. The BMC 580 can connect to the various server components (e.g., southbridge 540 or NIC 570) using any bus interface such as the system management bus (SMBus), RS-232 serial bus, IIC protocol, Ethernet, IPMB, low-pin count (LPC) bus, etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing. The IPMB is an IIC based serial bus for connecting various boards within the server.

The BMC 580 can connect to a network 508 using the NIC 570. The MC 570 of the server 502 can include computer hardware components that allow a computing device to communicate over the network 508. The NIC 570 can connect to an administrator device 506 through the network 508. The network 508 can be, for example, a local area network (LAN) such as Ethernet, Wi-Fi, or Bluetooth, or a wide area network such as the Internet. The network 508 can be a telecommunications network that allows network nodes to exchange data along network links. For example, the network 508 can be an Ethernet, a type of wired LAN protocol described by a set of standards together called IEEE 802.3. The administrator device 506 can be a device that can send command or inputs to the BMC 580 as well as receive information from the BMC 380. For example, the administrator device 506 can be a computer or mobile device connected to the network 508 for managing the installation of the system software.

The IPMI sub-system 504 can include a non-volatile storage 590 for storing information, which can include a System Event Log (SEL), a Sensor Data Record (SDR) Repository, and Field Replaceable Units (FRUs).

The server system 502 can obtain a configuration file, sometimes referred to as an answer file. The configuration file saves the installation option choices. The configuration file can differ depending on whether the system file to be installed is an OS or firmware.

In some implementations, the server system 502 can be in a powered down or shut off state when obtaining the configuration file. For example, the IPMI sub-system 504 and the NIC 570 can operate on standby power or in a low-power mode while the server system 502 is shut down. The BMC 580 of the IPMI sub-system 504 can receive the configuration file from the administrator device 506 over the network 508. In some other implementations, the server system 502 can be in a powered on state. For example, the server system 502 can be running an OS when obtaining the configuration file.

For example, the server system 502 may run an install application to obtain the configuration file. The install application can be, for example, web-based application with a web user interface for receiving user input. A web-based application is any program that can be rendered by a web browser. For example, the application can be run by an OS while the server system 502 is in a powered on state. In another example, the install application can be run by the BMC 580 even while the server system 502 is in a powered off state.

In some implementations, a server system 502 can generate the configuration file from user (e.g., an administrator 506) input. The server system 502 can receive user input to choose between different configurations options for Redundant Array of Independent Disks (RAID), device drivers, utilities, or other installation options for installing the system software (e.g., an OS or firmware). The server system 502 can generate the configuration file, sometimes referred to as an answer file, based on the user input received. For example, the BMC 580 can receive user input from the administrator device 506 over the network 308 for various configuration options and generate the configuration file.

In some implementations, the server system 502 can receive or import the configuration file instead of generating it from user input. For example, the configuration file can be received over the network 508 from the administrator device 506. In another example, the configuration file can be retrieved from a storage device such as a NVRAM, a SDRAM, an IPMI memory, or other similar device for storing information. In some implementations, the storage can be accessible by the BMC even while the server is in a powered off state.

After obtaining the configuration file, the server system 502 can save the configuration file to a storage device of the server system 502. For example, the install application can save the configuration file to the storage. The storage device can be a NVRAM, a SDRAM, an IPMI memory, or other similar device for storing information. For example, the storage device can be the non-volatile storage 590 of the IPMI sub-system 580.

In some implementations, the server system 502 can use an IPMI command (e.g., a IPMI OEM SET command) to store the configuration file to the storage device. For example, the install application can send the IPMI OEM SET command to the BMC 580 of the IPMI sub-system 504 to store the configuration file to the non-volatile storage 590.

After saving the configuration file to the storage device, the server system 502 can then boot or reboot. For example, if the server system 502 was previously powered down, the server system 502 can boot up. If the server system 502 was previously already powered on, the server system 502 can reboot. In some implementations, the install application can boot or reboot the server system 502.

After booting up, the BIOS 550 of the server can perform POST. The BIOS 550 can store firmware executed when the server system 502 is first powered on. The POST process can verify and test functionality of various hardware components such as central processing unit (CPU) registers, hard disk drives, optical reading devices, cooling devices, memory modules, expansion cards and the like. The BIOS 550 can also prepare a system environment required for running an OS. In some implementations, the BIOS 550 can run an OS installer from a storage device such as a HDD, a solid state drive (SSD), a removable flash drive, an optical disk (e.g., compact disk, digital versatile disc, Blue-ray Disc, etc.), or other similar storage.

After the BIOS 550 performs POST, the server system 502 can retrieve the configuration file from the storage device. In some implementations, the OS installer can retrieve the configuration file from the storage device. For example, the server system 502 can use an IPMI OEM GET command to retrieve the configuration file from the storage device. For example, the install application can send the IPMI OEM GET command to the BMC 580 of the IPMI sub-system 504 to retrieve the configuration file from the non-volatile storage 590.

After retrieving the configuration file, the server device 502 can install the system software based on the installation option choices from the configuration file. In some implementations, the OS installer installs the OS based on the configuration file. The server system 502 can install the system software using system software installation files/image. For example, the system software installation files/image can be retrieved from the disk drive 560. In another example the system software installation files/image can be retrieved from the network 508 such as a LAN (e.g., Ethernet, Wi-Fi, Bluetooth, etc.) or a wide area network such as the Internet.

The automatic installation system of the present invention supports the cross-platform remote installation and does not need to manually install specific software on the server and does not have the KVM or BMC support related hardware.

The present invention is described in the foregoing related embodiments, but the foregoing embodiments are merely examples for implementing the present invention. It needs be noted that the disclosed embodiments do not limit scope of the present invention. On the contrary, all modifications and equivalents included in a spirit and the scope of the present invention are included in the scope of the present invention.

What is claimed is:

1. An automatic installation method, suitable for a baseboard management controller (BMC), comprising:
from an input interface, transmitting an enable remote media through a first connection to a switch and setting an automatic configuration file to a BMC, wherein the input interface is a website user interface (UI) or an intelligent platform management interface (IPMI);
mounting a share folder from a first server through a second connection to the switch to the BMC;
uploading an ISO file from the BMC to the first server, and mounting the ISO file into the share folder;
copying the auto installation configuration file to the share folder, and repacking the auto installation configuration file into the ISO file to generate a repacked ISO file; and
transmitting the repacked ISO file to the first server,
wherein the first server is a network file system (NFS) server.

2. The method according to claim 1, further comprising:
transmitting a boot host command from the enable remote media.

3. The method according to claim 1, further comprising:
logining into the BMC from the input interface.

4. An automatic installation system, suitable for a baseboard management controller (BMC), comprising:
an input interface, transmitting an enable remote media through a first connection to a switch and setting an auto installation configuration file, wherein the input interface is a website user interface (UI) or an intelligent platform management interface (IPMI);
a BMC, receiving the enable remote media and the automatic installation configuration file; and
a first server, mounting a share folder through a second connection to the switch to the BMC, wherein the first server is a network file system (NFS) server;
wherein the BMC upload an ISO file to the first server when the first server mounts the share folder to the BMC, and the BMC copies the auto installation configuration file to the share folder, and repacked the auto installation file into the ISO file to generate a repacked ISO file, and the repacked ISO file is transmitted to the first server.

5. The system according to claim 4, further comprising:
a second server, receiving a boot host command from the enable remote media.

6. The system according to claim 4, wherein the BMC is logined from the input interface.

* * * * *